(12) United States Patent
Ta et al.

(10) Patent No.: US 11,880,869 B1
(45) Date of Patent: Jan. 23, 2024

(54) AUTOMATED DELIVERY SYSTEM WITH CONCIERGE COMMUNICATIONS

(71) Applicant: Productive Application Solutions, Inc., Sheridan, WY (US)

(72) Inventors: Peter Ta, Tucson, AZ (US); Gerald Maliszewski, San Diego, CA (US); Paul J Schuele, Washougal, WA (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

(21) Appl. No.: 17/962,513

(22) Filed: Oct. 9, 2022

Related U.S. Application Data (63) Continuation-in-part of application No. 17/830,783, filed on Jun. 2, 2022, which is a continuation-in-part
(Continued)

(51) Int. Cl.
*G06Q 30/00* (2023.01)
*G06Q 30/0251* (2023.01)
(Continued)

(52) U.S. Cl.
CPC ..... *G06Q 30/0266* (2013.01); *G06Q 10/0836* (2013.01); *G06Q 30/0244* (2013.01);
(Continued)

(58) Field of Classification Search
CPC ........... G06Q 30/0244; G06Q 30/0252; G06Q 30/0267
(Continued)

(56) References Cited

U.S. PATENT DOCUMENTS

| 6,882,269 B2 * | 4/2005 | Moreno | A47G 29/141 |
| | | | 340/568.1 |
| 9,076,336 B2 * | 7/2015 | Tippelhofer | G08G 1/148 |

(Continued)

FOREIGN PATENT DOCUMENTS

| FR | 2578996 A1 * | 9/1986 | G09F 21/04 |
| GB | 2402254 A * | 12/2004 | G06Q 20/127 |

(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski (57) ABSTRACT

An automated package transfer system and method are provided with a concierge interface. A publically accessible locker, associated with a package transfer service, has a compartment configured to limit access to a stored package. The locker can be used to deliver or pick up packages. The locker is moved to a selected temporary stationary location and access to the locker compartment is controlled. A communications subsystem selectively connects a (local) concierge user interface (UI) with a (remote) package transfer service locker attendant UI. The locker may be attached to a portable kiosk or a vehicle and positioned at a selected location using an autonomous driverless software application. The stationary locations may be cross-referenced to weighted values, which may be related to service prices and expenses. In one aspect, the concierge UI is connected to the (Continued)

locker attendant UI in response to the vehicle being parked in a selected stationary location.

18 Claims, 7 Drawing Sheets

Related U.S. Application Data of application No. 17/830,412, filed on Jun. 2, 2022, said application No. 17/830,412 is a continuation-in-part of application No. 17/230,008, filed on Apr. 14, 2021, now Pat. No. 11,270,349, which is a continuation-in-part of application No. 17/201,419, filed on Mar. 15, 2021, now Pat. No. 11,278,900, which is a continuation-in-part of application No. 17/179,574, filed on Feb. 19, 2021, now Pat. No. 11,257,120, which is a continuation-in-part of application No. 17/168,313, filed on Feb. 5, 2021, which is a continuation-in-part of application No. 17/133,722, filed on Dec. 24, 2020, now Pat. No. 11,055,743, which is a continuation of application No. 17/097,256, filed on Nov. 13, 2020, which is a continuation-in-part of application No. 17/071,043, filed on Oct. 15, 2020, now Pat. No. 11,037,199, which is a continuation of application No. 17/023,546, filed on Sep. 17, 2020, now Pat. No. 10,991,007, which is a continuation of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 63/310,857, filed on Feb. 16, 2022, provisional application No. 62/779,972, filed on Dec. 14, 2018.

(51) Int. Cl.
  *G06Q 30/0242* (2023.01)
  *G06Q 10/0836* (2023.01)
  *G07C 5/00* (2006.01)
  *G07C 5/08* (2006.01)
  *G07C 9/00* (2020.01)
  *G07C 9/38* (2020.01)

(52) U.S. Cl.
  CPC ..... *G06Q 30/0252* (2013.01); *G06Q 30/0267* (2013.01); *G07C 5/008* (2013.01); *G07C 5/0808* (2013.01); *G07C 9/00309* (2013.01); *G07C 9/00571* (2013.01); *G07C 9/38* (2020.01); *G07C 2009/0092* (2013.01)

(58) Field of Classification Search
  USPC .......... 705/14.63, 14.62, 14.49, 14.4; 725/32
  See application file for complete search history.

(56) References Cited

U.S. PATENT DOCUMENTS

| | | | | |
|---|---|---|---|---|
| 9,424,702 | B2* | 8/2016 | Ogishi | G07C 9/00912 |
| 10,096,183 | B2* | 10/2018 | Nitu | G07F 9/001 |
| 10,198,887 | B2* | 2/2019 | Ogishi | G07C 9/38 |
| 10,551,851 | B2* | 2/2020 | Yu | G05D 1/0297 |
| 10,629,017 | B2* | 4/2020 | Ogishi | G07C 9/38 |
| 11,341,800 | B2* | 5/2022 | Nitu | G07C 9/00904 |
| 11,375,839 | B2* | 7/2022 | Santangeli | G07C 9/00571 |
| 11,562,318 | B2* | 1/2023 | Robinson | G06Q 10/0836 |
| 2002/0009978 | A1* | 1/2002 | Dukach | G08G 1/01 455/99 |
| 2002/0035515 | A1* | 3/2002 | Moreno | B65G 1/0485 340/5.73 |
| 2002/0116289 | A1* | 8/2002 | Yang | G06Q 10/08 705/26.81 |
| 2004/0073449 | A1* | 4/2004 | Yang | G06Q 10/08 705/330 |
| 2004/0177008 | A1* | 9/2004 | Yang | G06Q 30/0601 705/26.1 |
| 2011/0131235 | A1* | 6/2011 | Petrou | G06F 16/532 707/769 |
| 2012/0245966 | A1* | 9/2012 | Volz | G06Q 10/02 705/5 |
| 2013/0307706 | A1* | 11/2013 | Kriezman | B60Q 1/503 340/988 |
| 2014/0214319 | A1* | 7/2014 | Vucetic | G01C 21/3446 701/533 |
| 2015/0006005 | A1* | 1/2015 | Yu | B60P 3/007 701/22 |
| 2015/0123818 | A1* | 5/2015 | Sellschopp | G08G 1/096816 340/932.2 |
| 2015/0254721 | A1* | 9/2015 | Rad | G06Q 30/0266 705/14.63 |
| 2015/0279210 | A1* | 10/2015 | Zafiroglu | G08G 1/065 340/932.2 |
| 2015/0348345 | A1* | 12/2015 | Ogishi | G06Q 10/083 340/5.6 |
| 2015/0356801 | A1* | 12/2015 | Nitu | G07F 9/002 340/5.61 |
| 2016/0116293 | A1* | 4/2016 | Grover | G01C 21/34 701/23 |
| 2016/0335822 | A1* | 11/2016 | Ogishi | G07C 9/38 |
| 2017/0301220 | A1* | 10/2017 | Jarrell | G05D 1/0022 |
| 2017/0309170 | A1* | 10/2017 | Wang | G08G 1/146 |
| 2018/0186309 | A1* | 7/2018 | Batten | B60Q 1/56 |
| 2018/0186311 | A1* | 7/2018 | Mason | B60R 21/01 |
| 2019/0287063 | A1* | 9/2019 | Skaaksrud | G08G 1/202 |
| 2019/0340860 | A1* | 11/2019 | Ogishi | G07C 9/38 |
| 2020/0187694 | A1* | 6/2020 | Santangeli | G07C 9/00309 |
| 2022/0296024 | A1* | 9/2022 | Santangeli | G07C 9/00912 |
| 2022/0311480 | A1* | 9/2022 | Wagner | H04B 7/0417 |
| 2023/0176588 | A1* | 6/2023 | Yu | G05D 1/024 701/22 |

FOREIGN PATENT DOCUMENTS

| | | | | |
|---|---|---|---|---|
| JP | 2010026474 A | * | 2/2010 | .......... G09F 21/048 |
| JP | 2018072077 A | * | 5/2018 | ............. G01S 19/14 |
| JP | 2018205399 A | * | 12/2018 | |
| WO | WO-2008135617 A1 | * | 11/2008 | ........... G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*
Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1 &isAllowed=y (Year: 2015).*
Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*
Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*
Technoframe. LED Bus Screens. (Nov. 18, 2011). Retrieved online Aug. 13, 2020. https://technoframe.com/led-bus-screens (Year: 2011).*

* cited by examiner

AUTOMATED DELIVERY SYSTEM WITH CONCIERGE COMMUNICATIONS

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to the use of a mobile concierge client interface and, more particularly, to an automated delivery system and method that automatically engages a personal concierge interface for a more personable user experience.

2. Description of the Related Art

The wider use of home delivery services has helped usher in a more decentralized concept of bringing goods and services to the user, rather than requiring the user to go to a central location shop. Automated driverless vehicles and gig agents may further promote this trend by reducing the costs of home delivery and decentralized services. To help reduce the distance between seller and buyer, parent patent application U.S. Ser. No. 17/830,783, filed on Jun. 2, 2022, entitled PORTABLE REAL ESTATE RESERVATION, invented by Peter Ta et al, describes a system for reserving publically accessible real estate locations.

Parent U.S. Pat. No. 11,138,634, entitled GIG VEHICLE PARKING, invented by Peter Ta et al., with a filing date of May 6, 2021, describes a system that permits agents to deliver selected mobile platforms to corresponding locations.

SYSTEM AND METHOD FOR MOBILE GIG LOCKER, invented by Peter Ta et al., U.S. Ser. No. 17/097,256, filed Nov. 13, 2020, describes a locker, with a package exchange mechanism, that can be parked temporarily in selected locations.

Parent application Ser. No. 17/168,313, filed on Feb. 5, 2021, entitled SYSTEM AND METHOD FOR THIRD PARTY MOBILE MEDIA CONTROL, describes an autonomously driven mobile media system.

However, there is a problem with providing local distribution nodes in that while distribution may be automated in the interest of reducing costs, automated services often provide an unsatisfactory user experience, especially if there is an issue with the product or service, or a customer complaint. In such a situation, the user must find the vendor contact information and order number, and attempt to contact the vendor using their cell phone or web browser. For example, in the case of a pizza delivery by an automated vehicle, the user must either accept an incorrect order, or refuse the order and make a call (or access a website) to file a complaint with the vendor.

Contrary to the trend of reducing costs by providing automated, human-free services, it would be advantageous if an automated kiosk or delivery vehicle could provide a personal concierge interface that allowed the user to speak directly with a human being in the event of a problem. Even in the case of a trouble-free delivery, it would be reassuring to a user to know that someone (an actual person) "cares" about the delivery. To some extent this type of service is provided with website "chat" boxes that permit a user to communicate with a software program, and sometimes an actual human being.

It would be advantageous if the kiosk or delivery vehicle vendor provided the concierge communication subsystem so the user would not have discover the vendor's contact address, and initiate communications.

It would be advantageous if the concierge interface provided immediate real-time contact between the user and the vendor.

SUMMARY OF THE INVENTION

A system and method are disclosed herein permitting a user to make an immediate, hands-free, personal contact with the vendor of an automated mobile kiosk or delivery vehicle. As is conventional, the user's order may by initiated via a phone call, mobile app, or website. These communication methods typically require the use of the customer's phone or Internet-connected personal computer. Once the delivery or service is provided, the burden of establishing a communications link falls on the vendor in the claimed system, in the interest of greater user convenience. Further, the vendor establishes a concierge communication link that can be a real-time video chat with a vendor agent, which helps mitigate against the dehumanizing aspects of automated services. The system may also determine a value (e.g., cost) assigned to the delivery/service based upon location.

Accordingly, an automated package transfer method is provided with a concierge interface. The method provides a publically accessible locker, associated with a package transfer service, having a compartment configured to limit access to a stored package. The locker can be used to deliver or pick up packages. The method moves the locker to a selected temporary stationary location and controls access to the locker compartment. A communications subsystem associated with the locker is provided that selectively connects a (local) concierge user interface (UI) with a (remote) package transfer service locker attendant UI. The concierge UI may include a microphone, an audio speaker, a visual screen, a keypad, a camera, a two-dimensional image projector, a three-dimensional image projector for a hologram, or combinations of these components. The communications subsystem connects a locker embedded communication device with the package transfer service server.

The locker may be attached to a portable kiosk or a vehicle. For example, the method may position a vehicle (with locker) at a selected location using an autonomous driverless software application. A location subsystem may be attached to the vehicle to supply vehicle location information, which the communications subsystem transmits to the package transfer service server. The stationary locations may be cross-referenced to weighted values, which in turn may be related to service prices and expenses. In one aspect, the concierge UI is connected to the locker attendant UI in response to the vehicle being parked in a selected stationary location. Generally, the locker may be attached to self-powered vehicles, towable vehicles, portable stations, ground vehicles, nautical vehicles, and airborne vehicles.

The concierge UI may include a microphone to supply audio (voice) signals, a keypad to accept (help) prompt signals, locker access sensor to determine if the locker has been opened, a camera to supply images signals, or combinations of these components. The communications subsystem may transmit these signals to the package transfer service server for analysis and receive an acknowledgement, and the concierge UI may be connected to the locker attendant UI in response to the acknowledgement. The method may also provide a media projection subsystem, for projecting a media message to the general public. In one aspect, the media projection subsystem projects media messages via a concierge UI display when the concierge UI is not connected to the locker attendant UI.

The method may also provide sensors to receive local environmental data from devices such as cameras, microphones, weather sensors, odor sensors, photodetectors, chemical sensors, wireless spectrum receivers, wireless service traffic analyzers, radiation sensors, air quality monitors, and combinations thereof. The communications subsystem may transmit environmental data to the package transfer service server. In addition, the method may provide a publically accessible access point (AP) such as an IEEE 802.11 Wireless Local Area Network (WLAN) AP, an IEEE 802.15 Wireless Personal Area Network (WPAN) AP, or combinations thereof.

Additional details of the above-described method, and an automated package transfer system with a concierge interface, are provided below.

DETAILED DESCRIPTION

Figure 1A:
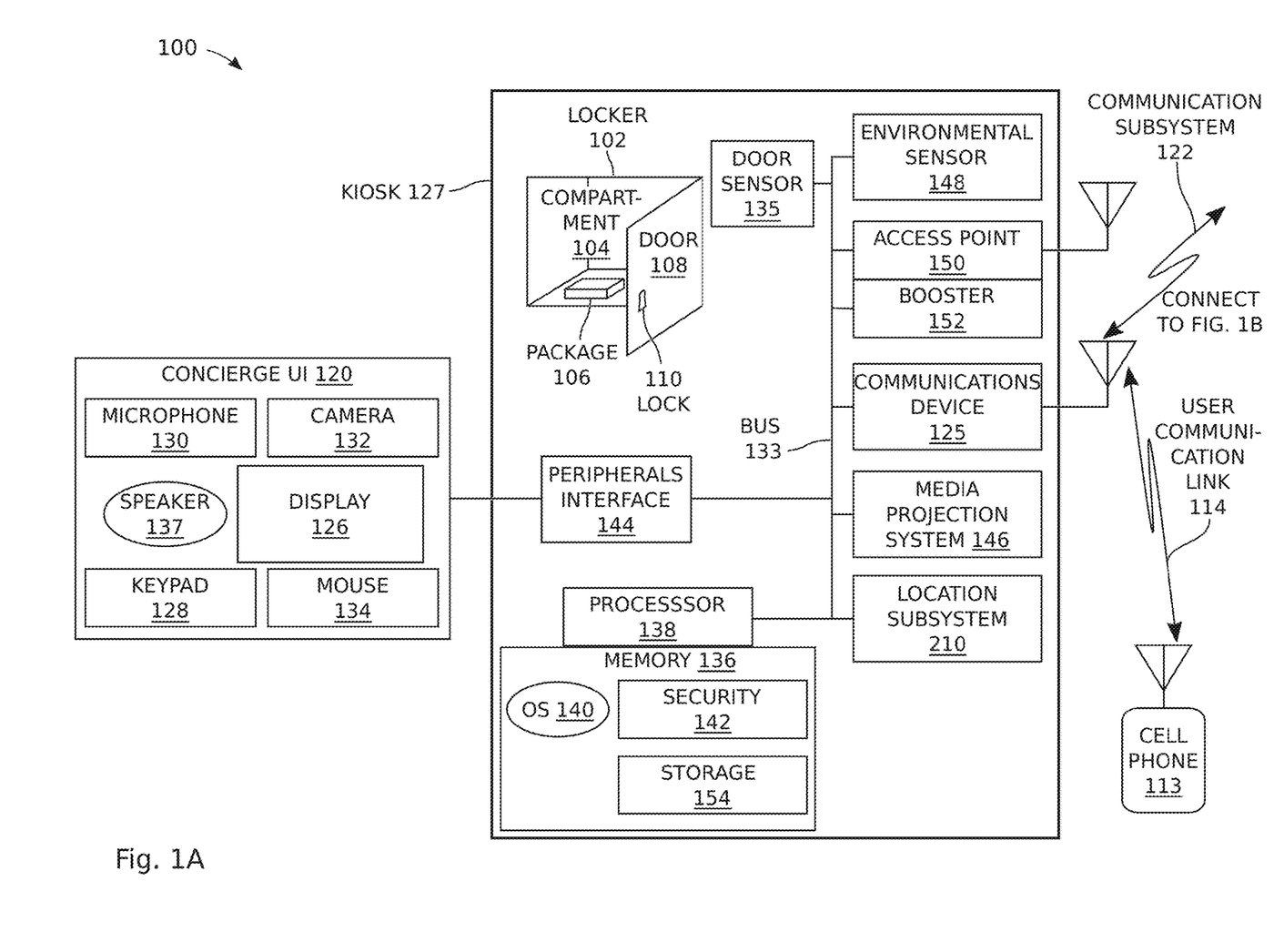
FIGS. 1A and 1B are schematic block diagrams of an automated package transfer system with a concierge interface.
Figure 1B:
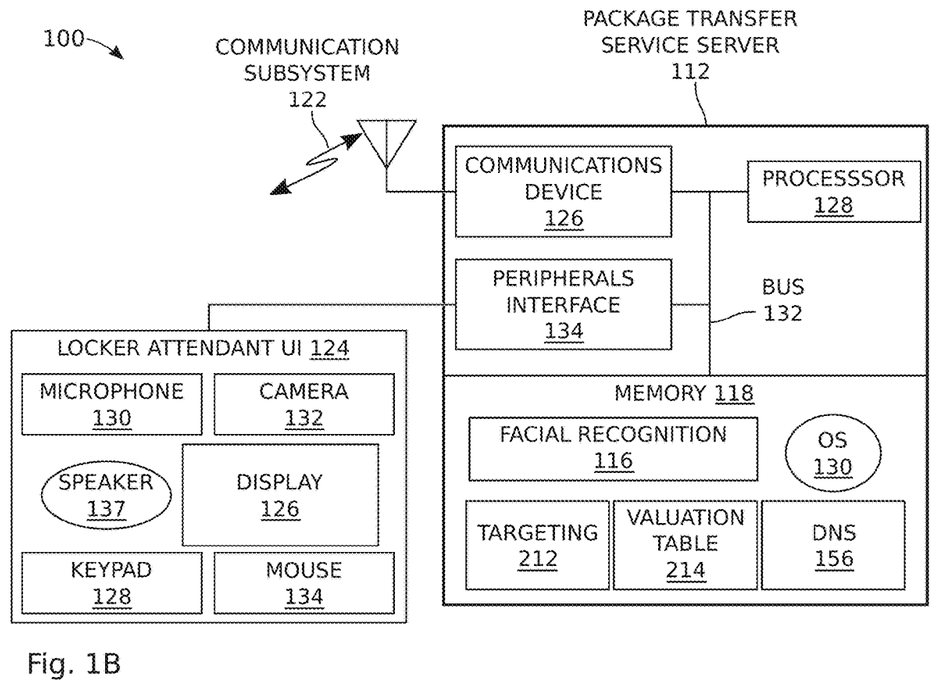

FIGS. 1A and 1B are schematic block diagrams of an automated package transfer system with a concierge interface. The system 100 comprises a publically accessible mobile locker 102 with a compartment 104 configured to limit access to a stored package 106. A security mechanism controls access to the locker compartment 104. For example, the security mechanism may be a door 108 of the locker 102 equipped with a lock 110 that is opened with a digital code entered into a locker keypad, sent by a package transfer service server 112 to a user cell phone 113 (as shown) or computing device via user communication link 114. Alternatively, the lock 110 is opened when a locker camera sends a user image to a server facial recognition software application 116 stored in a non-transitory memory 118 of the server 112. As another alternative, the lock may be automatically opened when the user replies to a text or email message sent by the server 112. The system is not limited to any particular means of securely controlling access to the locker 102. The user communication link 114 link may also be the means by which the package transfer operation is initiated and paid for. For simplicity, the above-mentioned camera and keypad may be considered as components of a concierge user interface (UI) 120, as described in more detail below. As used herein, a UI is an interface that is manipulated by a human being.

A communications subsystem 122 selectively connects the concierge UI 120 with a locker attendant 124 UI associated with the package transfer service. The communications subsystem 122 may also be referred to as a local or locker communications subsystem. As is conventional, both the concierge 120 and the locker attendant 124 UIs may including video displays 126, keypads 128, microphones 130, cameras 132, mice 134, audio speaker 137, stylus' (not shown), or touchscreens (not shown), to name a few examples, for use by a human agent or system user. The locker may also include a locker access sensor 135 to detect if the locker door is open or closed. More explicitly, the communications subsystem 122 connects a locker embedded communication device 125 with the package transfer service server communications device 126. As shown, the communications subsystem 122 may be enabled via wireless (e.g., cellular) links but, in some aspects, part or all of the communications may be enabled using Ethernet and fiber optics links, as would be well known in the art.

The package transfer service may deliver packages, receive packages, or both deliver and receive packages. It should be understood that the package 106 may alternatively be associated with a service, in which case the locker may represent a means of performing the service. For example, the locker 102 may be mounted in a kiosk 127, and may not only provide pizza as a package 104, but it may also bake the pizza as a service. As another example, the kiosk 127 may be an automated teller machine (ATM) providing or accepting package (money) transfers and information services. The system may also provide communication or data collection services.

As is conventional, the server 112 may comprise a processor 128 and an operating system (OS) 130 stored in memory 118. These computing structure components may be enabled through a system bus 132 and peripherals interface 134. The kiosk locker system may potentially be enabled using hardware components and combinational logic circuits. However, the locker may use a computing device including a non-transitory memory 136, processor 138, OS 140, a security mechanism software application 142, bus 133, and a peripheral interface 144.

The non-transitory memories 118 and 136 described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device.

For convenience, the above-mentioned software components are shown embedded as single schematic blocks, but it should be understood that these components are not necessarily embedded in a single hardware unit or server, or in communication with each other. Alternatively, the software applications may be cooperating components of an overall software system. The server may also represent a network of servers in communication with each other.

Figure 2:
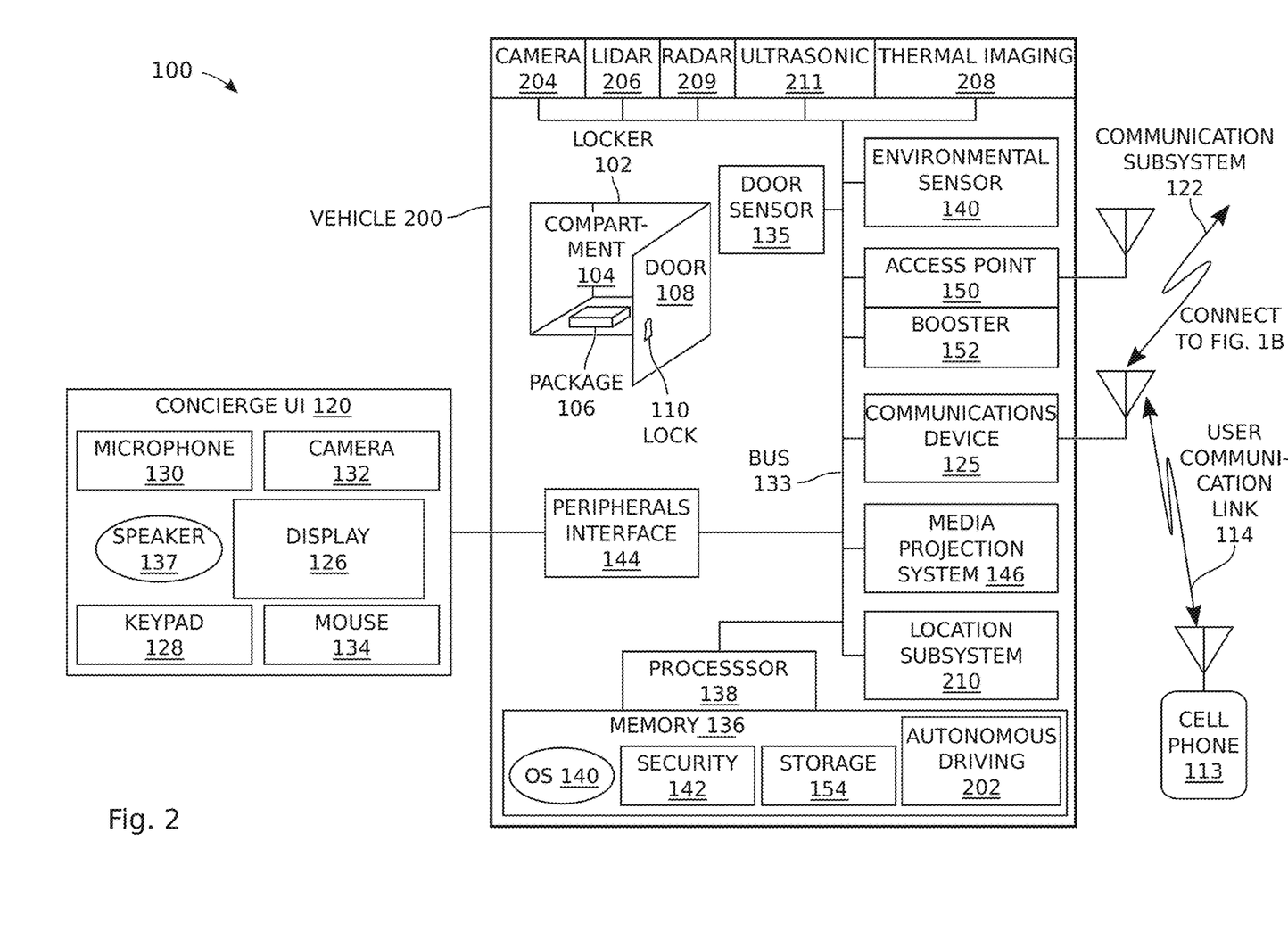
FIG. 2 is a schematic block diagram depicting a vehicle-enabled automated package transfer system.

FIG. 2 is a schematic block diagram depicting a vehicle-enabled automated package transfer system. In this aspect, the system 100 includes a vehicle 200, with the locker 102 being attached to the vehicle, parked in a selected temporary stationary location. The components shown in FIG. 1B and described above would likewise be implemented in this version of the system and are not repeated here in the interest of brevity. In one aspect, the vehicle 200 is an autonomous driverless vehicle. In this case, an autonomous driving application 202 is embedded in non-transitory locker memory 136. At least Rivian Driver+, Google, and Tesla are known to have developed, and continue to develop applicable software programs to support autonomous driving, which would be useful in supporting the system described herein. Also in support of autonomous driving, the vehicle may include navigation sensors such as a vehicle camera 204, LIDAR 206, thermal imaging sensors 208, RADAR sensor 209, ultrasonic sensor 211, and a location subsystem 210 to provide vehicle location information, and combinations thereof. Not shown, the sensors might also include a motion detector or photodetector. The vehicle 200 communications subsystem 122 may transmit the vehicle location information and sensor data to the package transfer service server 112 or an associated server (not shown). The location may also be used in directing the vehicle 200 to a selected location and/or verify that the vehicle is parked in a desired location. In one aspect, the concierge UI 120 is connected to the locker attendant UI 124 in response to the vehicle being parked in a selected stationary location. It should be noted that the package transfer service server associated with the vehicle is essentially the same as the server associated with the kiosk, and FIG. 1B should be used to reference any description of server components.

In one aspect of the kiosk of FIG. 1A or the vehicle of FIG. 2, the locker system may be used as an advertising tool or as a means of collecting user data. For example, the locker may dispense a small prize, free sample, brochure, or a token redeemable at a nearby store, or a store located out of sight (e.g., across a shopping mall). This prize may be an item that suggests a nearby business. In this aspect, the media projection subsystem can be used to display media in the form of an advertisement to attract users. The user may be able to use the concierge UI to open the locker and remove the prize without any conditions, or the locker may be opened in exchange for the user entering contact information into the concierge UI. For example, the user may enter their cell phone number, receive a QR code on their phone, and the locker may open in response to the concierge UI scanning the QR code. In this example, additional media messages can be pushed to the user's cell phone once the cell phone number is collected as data. The locker could be enabled as a magazine that is loaded from the back side, so prizes are limited one per user.

The use of automated delivery systems is expected to benefit users by reducing costs and saving time by minimizing human labor, and for that reason it is expected that these types of services will increase popularity. Against the trend of increased automation and decreased human involvement, the system described herein adds back a human component in the form of an actual live locker attendant that can interact with the consumer at the time of the delivery/service. The reintroduction of human labor into the automated processes will likely increase to delivery/service costs in the short-term, but counter-intuitively, it is expected that human-to-human contact at the point of sales will reduce returns and complaints, and will make consumers more likely to use an automated service when real-time human help is readily available. In this way, a cost savings may be incurred.

As is also the case with both the portable kiosk of FIG. 1A and the vehicle of FIG. 2, the targeting subsystem 212 of FIG. 1B is enabled as a software application embedded in server memory 118 including a series of processor executable instructions that cross-reference stationary locations to weighted values. The weighted values may be used to determine prices, expenses, or rewards. For example, a delivery/service provided in a high population density area may cost more due to higher demand. As another example, a delivery/service may be based upon travel time or travel distance. Some examples of vehicles that can be equipped with mobile lockers include self-powered vehicles (e.g., cars, trucks, mobile kitchen, food truck, food delivery vehicle, and vans), towable vehicles (e.g., a trailer mounted kiosk), portable stations (kiosks), ground vehicles, nautical vehicles, and airborne vehicles (e.g., drones). In the case of an airborne vehicle, "parking" may be understood to be maintaining an approximate location in midair, as well as a landing location. In the case of air or nautical vehicles, the launching site, landing site, or midair position may be the stationary or parking location.

A "stationary location" may be a parking location. "Parking" is typically understood to be location where a vehicle is temporarily left with its engine off, or if not self-powered, left without means of movement. Vehicles or mobile units may be "parked" along city streets or in publicly accessible areas, such as parking lots. Mobile units are typically "parked" for limited durations of time, typically a matter of hours, but the durations can be as small as minutes or larger than even weeks. However, a location can also be stationary, such as might occur when a mobile unit is stopped at a traffic sign or when legally double-parked. "Temporary" is understood to typically be a duration of several minutes to several hours, although it may also be a matter of days or even weeks. "Occupation" is understood to mean filling a space or location so completely that another vehicle or entity is unable to fill that space. In the case of drone aircraft or boats, these vehicles may need to be powered with engines running to maintain a stationary location.

Also as shown in FIG. 1A, the concierge UI 120 may further comprise one or more of the following components: a microphone 130 to supply audio signals, a keypad 128 to accept prompt signals, locker access sensor 135 signals, and a camera 132 to supply images signals. The communications subsystem 122 may transmit the signals to the package transfer service server 112 for analysis (e.g., security analysis), receive an acknowledgement, and the concierge UI 120 is connected to the locker attendant UI 124 in response to the acknowledgement. For example, the acknowledgment may be sent if facial matching software 116 embedded with the package transfer service server 112 or vehicle memory (not shown) matches a user's face with an authorized reference face. Alternatively, the acknowledgement may be based upon the user entering a code to the locker (received via the user communication link 114), or opening the locker 102. That is, the concierge interface 120 can be used as part of the security mechanism to gain access to the locker 120, and/or as a means of enabling the user-to-locker attendant connection.

As noted above, the concierge UI 120 may further comprise an audio speaker 137 and a visual screen or display 126 (e.g., a liquid crystal display (LCD) or light emitting diode (LED) display), a keypad 128, and a camera 132. The visual display can also be a two-dimensional image projector displaying an image on a sidewalk, building wall, or a kiosk/vehicle side, or a three-dimensional image (i.e., hologram) projector.

As shown in FIGS. 1A and 2, the system 100 may further comprise a media projection subsystem (MPS) 146, for projecting a media message to the general public. As shown, the media projection subsystem 146 may be a separate interface from the concierge UI. Local memory 136 storage module 154 may store received or pre-loaded massages for display. In addition to using a LED or LC display, the media projection subsystem 146 may use an image projector, a retractable screen, a topper, holographic display, a light emitting diode display, wallscape, electroluminescent (EL) display, switchable glass displays, persistent image fan, or combinations thereof. The media projection subsystem 146 may be an image projector enabled as a liquid crystal (LC) or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. In other words, the media projection subsystem 146 may present a 2-dimensional or 3-dimensional image, which may or may not be transitory. Transitory images include a series of still images, videos, or combinations thereof. The media projection subsystem 146 may also broadcast audio messages, or a combination for audio and visual messages. However, in one aspect the media projection subsystem projects media messages via the concierge UI display 126, when the concierge UI is not connected to the locker attendant UI 124.

As explicitly shown in FIG. 1A, but equally applicable to FIG. 2, the system 100 may further receive local environmental data from environmental sensors 148.

Figure 3:
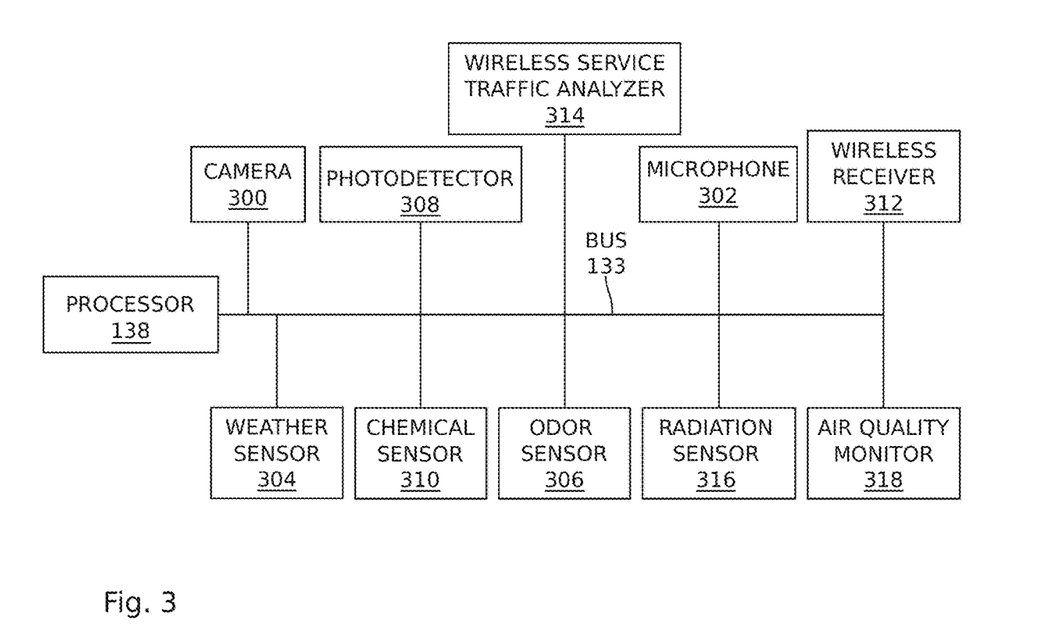
FIG. 3 is a schematic block diagram depicting environmental sensor components.

FIG. 3 is a schematic block diagram depicting environmental sensor components, which may include the camera (132) and microphone (130) of the concierge UI (see FIGS. 1A and 2), or they may be a separate camera(s) 300 and microphone 302 dedicated to collecting environmental data. Other environmental sensors include a weather sensor 304, odor sensor 306, photodetector 308, chemical sensor 310, a wireless spectrum receiver 312, a wireless service traffic analyzer 314, radiation sensor 316, and air quality monitor 318. The communications subsystem may transmit the environmental data to the package transfer service server or an associated data collection or public service server for public safety, traffic, and weather services. In one aspect, the targeting subsystem weighted values table 214 is updated in response to the local environmental data.

As shown in FIG. 1A, but equally applicable to FIG. 2, the system further comprise a publically accessible access point (AP) 150, such as an IEEE 802.11 Wireless Local Area Network (WLAN) AP, an IEEE 802.15 Wireless Personal Area Network (WPAN) AP, and combinations thereof. In this case the communications subsystem 122 may enable AP data traffic via a communications subsystem cellular network, and/or in addition, communicate with the package transfer service server 112, which may store, data mine, or pass along related data to other server entities (not shown). Alternatively, but less common, the access point may an IEEE 802.15.4 Zigbee, WPAN IEEE 802.15 Li-Fi or wireless USB device. Even more unlikely as an access point are Long Range Wireless systems. As used herein, a "publically accessible" is a system that can be accessed by the general public without a password or similar security measures, or where the password is publically distributed. One example of a publically accessible AP is the WiFi hotspot service provided by a typical Starbucks coffee shop. In the case of a password being required for access, the password may be printed on the mobile platform, displayed by the media projection subsystem, or made available through a media projection phone application or website.

As noted above, the server 112 may include a targeting subsystem 212 with a valuation table 214. The value may be linked to a reward, based for example upon location population density, neighborhood safety, type of delivery, pick up, or service, time of day, vehicle type, or distance from the vendor. The (weighted) value of a delivery/service may be cross-referenced to stationary locations. Weighted values can be established using geo-fencing services, such as provided by Radar Labs, Inc. Geo-fencing uses technologies like GPS, radio frequency identification (RFID), WiFi, cellular data, and internet protocol (IP) address ranges, to build virtual fences in geographic regions. These virtual fences can be used to track the physical location of a device (e.g., smartphone) active in the particular region or the fence area. The location of the person using the device is taken as geocoding data and can be used to construct a picture of Internet Protocol (IP) traffic in those areas. However, the geo-fencing information used to support the above-described valuation table is typically not instantaneously updated. To support instantaneous real-time updates, the valuation table may receive local environmental data, as described above. As noted above, a kiosk or vehicle is potentially able to supply local environmental data from a camera, microphone, odor sensor, photodetector, chemical sensor, wireless spectrum receiver (e.g., detecting the noise floor in Bluetooth, WiFi, or cellular bands), wireless service traffic analyzer (e.g., detecting traffic through a publically accessible AP or the above-mentioned geo-fencing technologies), radiation sensor, local weather sensor (e.g., temperature or rain), and/or air quality monitor.

Examples of a location subsystem 210 include a Global Positioning Satellite (GPS) system receiver, Global Navigation System (GNSS), assisted GPS or GNSS taking advantage of cell tower data, a Wireless Local Area Network IEEE 802.11 (WiFi) positioning system, cell-site multilateration (e.g., Skyhook), satellite multilateration, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796, 340, which is incorporated herein by reference, camera images and the location data of proximate smartphones, laptops, and personal communication devices can also be used to determine location.

The most typical examples of the communications subsystem 122 are wireless cellular systems (e.g., Global System for Mobile Communications (GSM), Universal Mobile Telecommunications System (UMTS)-time division duplexing (TDD), Long-Term Evolution (LTE), 4th Generation (4G), or $5^{th}$ Generation (5G)), and the like. Less typically, the communications subsystem 122 may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). The system 100 is not limited to any particular type of communication subsystem. For simplicity, FIG. 1A depicts a direct wireless communications subsystem 122 connected between the kiosk 127 (or vehicle, FIG. 2). However, it should be understood that a typical cellular link includes intervening base station and hardline connections.

In one aspect, the access point 150 and/or communications subsystem 122 can be used to collect data from entities passing by, or engaging with the access point or using the communications subsystem. This data can be stored in local memory storage module 154 for subsequent recovery or transmission to the server in support of data gathering or geo-fencing data. In support of data mapping, the access point is publically accessible to user devices that include smartphones, personal devices, or generally any type of computing device. Typically, the user devices are enabled for WiFi and Bluetooth communications. If left enabled, as is the typical case for many users, the user device is able to interact with a nearby access point even if a communication data link is not established. As used herein, the term data mapping includes the collection of data from the user devices. In one aspect, user data information (e.g., addresses) is collected voluntarily, with the user explicitly agreeing to data collection in response to an access point provided services, such as the provision of an Internet browser, email, Internet, or social media services. For example, if the access point is a WiFi hotspot that accepts Uniform Resource Locator (URL) address requests from a user device (e.g., a smartphone), the URL address requests may be transmitted to a Domain Name System (DNS) service 156 embedded with the server 112 hosting the system of FIG. 1B. The DNS service makes address searches. Otherwise, the information is collected without an explicit agreement by the user, where legal. Rewards to entities may be based upon the volume of traffic through the WiFi hotspot or access point data collected. In some aspects, camera images, in cooperation with a facial recognition software application 116 (e.g., DeepFace), are used for data tracking.

As shown in FIG. 1A, but equally applicable to FIG. 2, the system 100 may include a signal booster 152, such as a device provided by WeBoost, or a similarly functioning proprietary device. The signal booster 152 may be independent or, as shown, may use the communications subsystem 122. The booster 152 may act as a relay between a proximately located user cellular device and a cellular network (i.e., base station or satellite). In other aspects, a signal booster 152 acts to relay Internet signals, such as might be useful when employed with the StarLink or similar Internet service, as the StarLink ground units require an uninterrupted view of the sky (i.e., view of the StarLink satellites). For example, the kiosk 127 (or vehicle 200) may be positioned in areas of weak cellular coverage. Improved cellular coverage necessarily improves Internet and WiFi services carried by the cellular service.

As used herein, an "entity" or "user" may be a person, a business, a corporation, any type of social organization or business unit, a physical device, or a software application. For simplicity, the entities may be identified as the hardware components being used by, or associated with a business, person, corporation, or social organization. In this case, the entity may be described as a computer, smartphone, media projection subsystem, server, or vehicle, to name a few examples.

As noted above, the kiosk or vehicle may include a camera to record images of the proximate geographic location. The camera images may be stored in local memory storage module 154, or the communications subsystem 122 may transmit the images. In one aspect, the camera may also be used to modify the value of the target location. For example, the recorded traffic in a location may be greater than anticipated, and the weighted value adjusted accordingly. That is, images recording higher pedestrian or vehicular traffic may indicate, at least temporarily, a greater location value. The data may be used to help determine the efficacy of the media or location. Alternatively or in addition, the camera images my act to verify a particular location.

Figure 5:
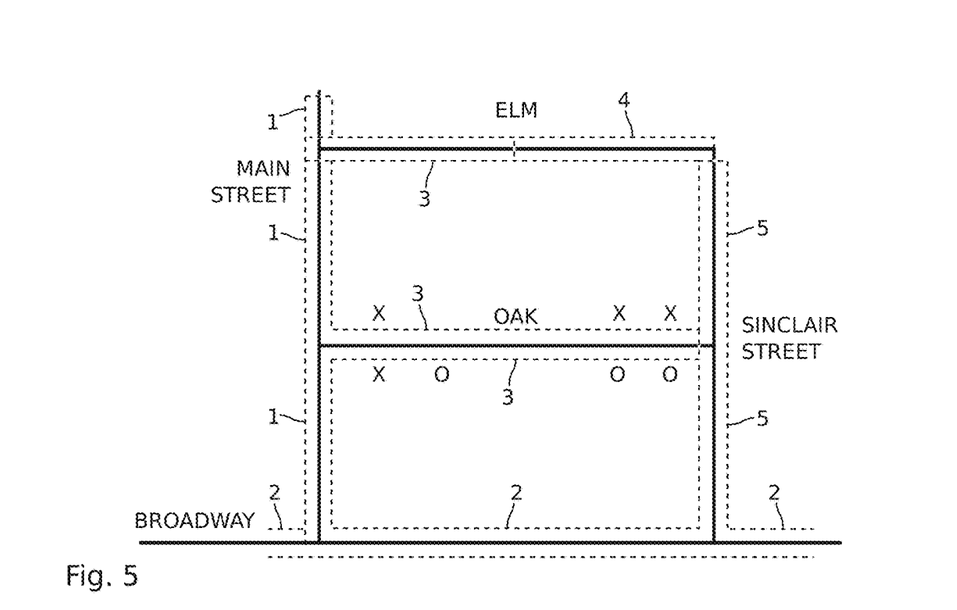
FIG. 5 is a plan view of geographic regions cross-referenced to the weighted value of various locations.

FIG. 5 is a plan view of geographic regions cross-referenced to the weighted value of various locations. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5. The site table subsystem may include a listing of occupied spaces along Oak Street (as marked with an "x"), as may list a stationary location along Oak Street (as marked with an "o") available for selection.

Figure 4:
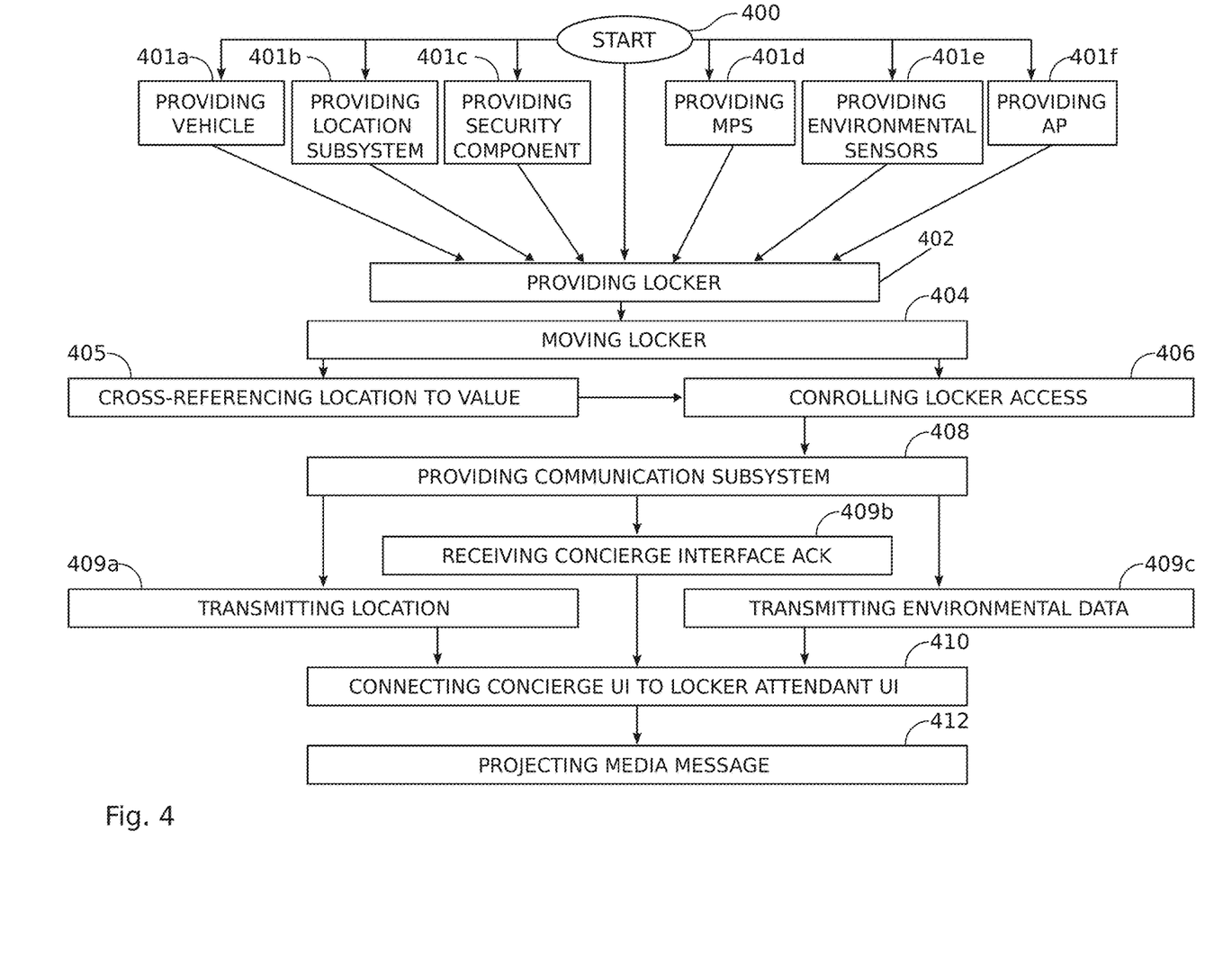
FIG. 4 is a flowchart illustrating an automated package transfer method with a concierge interface.

FIG. 4 is a flowchart illustrating an automated package transfer method with a concierge interface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 400.

Step 402 provides a locker, associated with a package transfer service, with a compartment configured to limit access to a stored package. Step 404 moves the locker to a temporary stationary location. Optionally, Step 405 uses a targeting subsystem to cross-reference stationary locations to weighted values. Step 406 controls public access to the locker. Step 408 provides a communications subsystem with a concierge UI. Using the communications subsystem, Step 410 connects the concierge UI with a locker attendant UI associated with the package transfer service. In using the communications subsystem, Step 410 connects a locker embedded communication device with the package transfer service server.

In one aspect, Step 401a provides a vehicle, and the locker of Step 402 is attached to the vehicle. As noted above, vehicle may be a self-powered vehicle, towable vehicle, portable station, ground vehicle, nautical vehicle, or airborne vehicle. Alternatively, a portable or a permanently stationary kiosk may be provided. Moving the locker in Step 404 may entail positioning the vehicle at a selected location using an autonomous driverless software application embedded in a non-transitory memory. In another aspect, Step 401b provides a location subsystem attached to the vehicle to supply vehicle location information, and in Step 409a the communications subsystem transmits the vehicle location information to a package transfer service server. In Step 410 the concierge UI may be connected to the locker attendant UI in response to the vehicle being parked in a selected stationary location.

In one aspect, Step 401c provides a security component such as a microphone to supply audio signals, a keypad to accept prompt signals, locker access sensor signals, and a camera to supply image signals, or combinations thereof.

Step 409b then uses the communications subsystem to transmit the signals to a package transfer service server for analysis and receive a concierge interface acknowledgement (ACK). The concierge UI is connected to the locker attendant UI in Step 410 in response to the acknowledgement. Step 401c may additionally provide concierge interface components including a microphone, an audio speaker, a visual screen, a keypad, a camera, a two-dimensional image projector, or a three-dimensional image projector.

Step 401d may optionally provide a media projection subsystem (MPS), for projecting a media message to the general public in Step 412. If the media projection is a component of the concierge UI, Step 412 may project media messages via the concierge UI, when the concierge UI is not connected to the locker attendant UI. In another aspect, Step 401e may provide sensors to receive local environmental data, the sensors potentially being cameras, microphones, weather sensors, odor sensors, photodetectors, chemical sensors, wireless spectrum receiver, wireless service traffic analyzer, radiation sensor, air quality monitor, and combinations thereof. Step 409c may use the communications subsystem to transmit environmental data to a package transfer service server. In yet another aspect, Step 401f may provide a publically accessible AP, such as an IEEE 802.11 WLAN AP, an IEEE 802.15 WPAN AP, an Internet signal booster, a cellular signal booster, and combinations thereof.

Figure 6A:
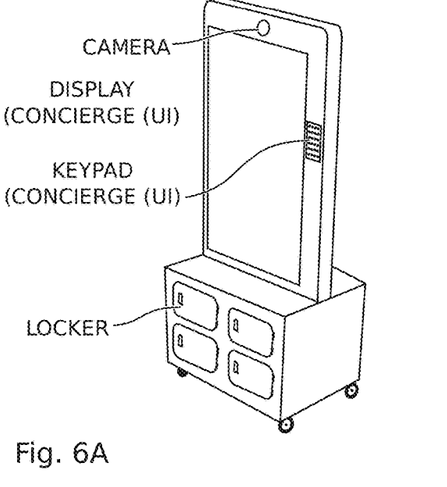
FIGS. 6A through 6C depict exemplary kiosk structures.
Figure 6B:
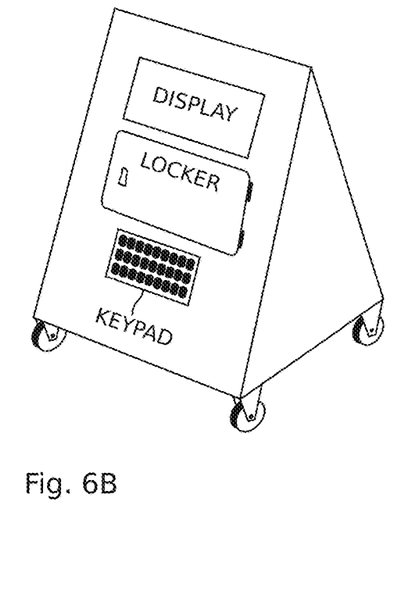
Figure 6C:
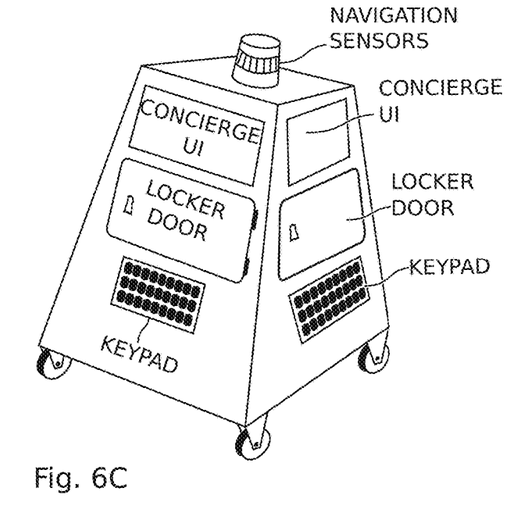

FIGS. 6A through 6C depict exemplary kiosk structures. FIG. 6A depicts a 2-sided vertically planar design. FIG. 6B depicts different perspective views of a 2-sided pyramid and FIG. 6C a 4-sided pyramid. Although not explicitly shown in these figures, the kiosk may also take a humanoid shape, with arms and legs, and the humanoid kiosk may also uses its legs to move.

Figure 7:
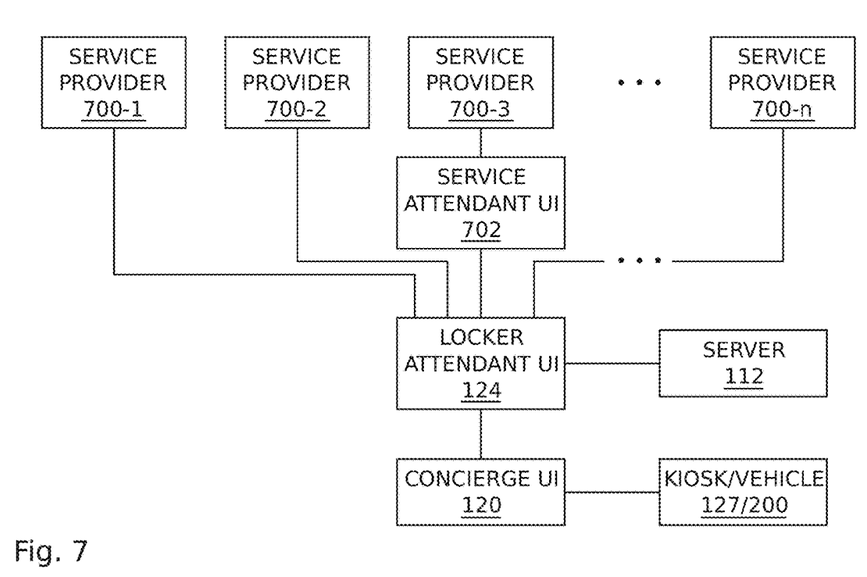
FIG. 7 is a schematic block diagram depicting a networked locker attendant UI.

FIG. 7 is a schematic block diagram depicting a networked locker attendant UI. In this aspect, the locker attendant UI 124 and supporting server 112 act as a bridge between the concierge UI 120 and various public service or commercial service providers 700-1 through 700-n. These service providers may reward the entity associated with the locker attendant UI 124 for providing this bridging function or, alternatively, the locker attendant UI associated entity may be rewarded by the entity associated with the concierge UI 120. In one aspect, a service provider (e.g., service provider 700-3) may have their own service attendant UI 702 to interact with the locker attendant UI 124 or directly with the concierge UI 120. The various service providers may form an independent network of servers to which they voluntarily belong, and may work with a number of different UIs (not shown) that also act as a bridge to the concierge UI 120 or similar user interfaces.

Figure 8A:
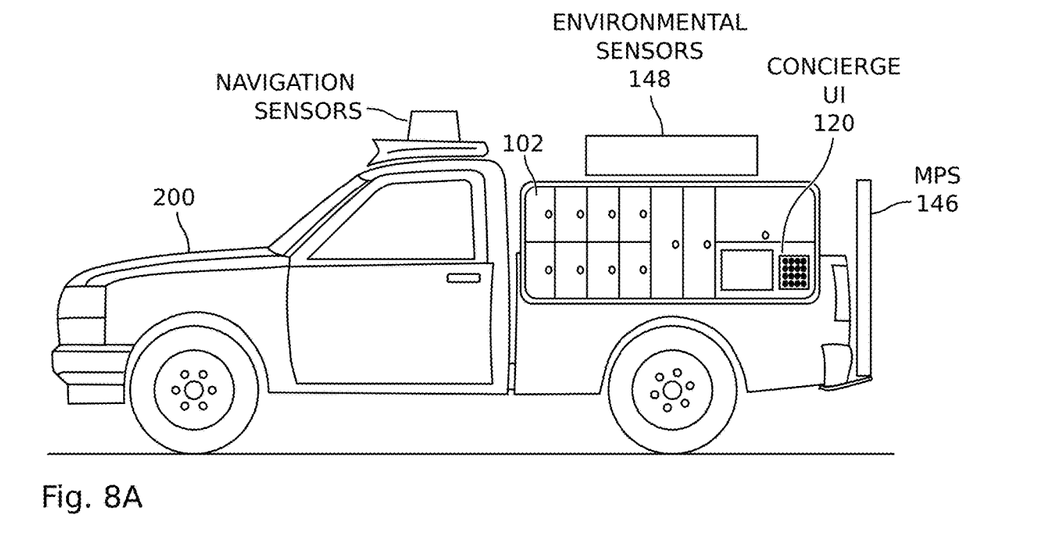
FIGS. 8A and 8B depict exemplary vehicle transfer systems.
Figure 8B:
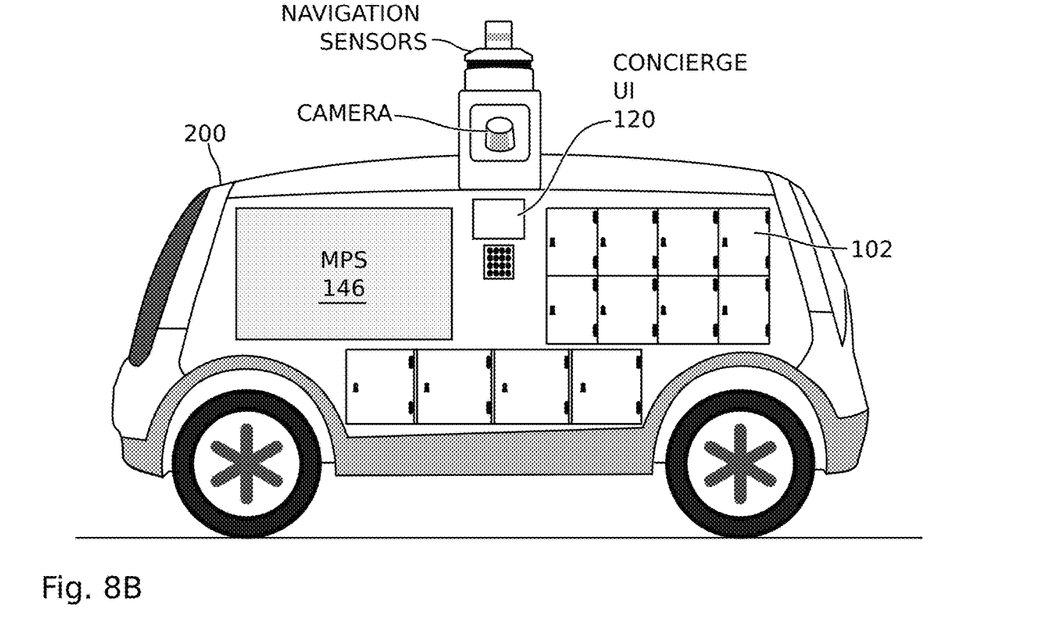

FIGS. 8A and 8B depict exemplary vehicle transfer systems.

Systems and methods have been provided for automated package transfer service with an attached concierge UI. Examples of particular message structures, schematic block linkages, and hardware units have been presented to illustrate the invention. However, the invention is not limited to merely these examples. Other variations and embodiments of the invention will occur to those skilled in the art.

We claim:

1. An automated package transfer system with a concierge interface, the system comprising:
   a vehicle;
   a location subsystem attached to the vehicle providing vehicle location information;
   a targeting subsystem cross-referencing stationary locations to weighted values;
   a publicly accessible mobile locker attached to the vehicle, with a compartment configured to limit access to a stored package;
   a locker security mechanism for controlling access to the locker compartment;
   a locker communications device embedded with the locker transmitting vehicle location information;
   a concierge human user interface (UI) connected to the locker communication device;
   a package transfer service server comprising:
   a locker attendant human UI;
   a package transfer service communication device connected to the locker communication device; and,
   wherein the concierge human UI is selectively connected to the locker attendant human UI in response to the locker being parked in a selected temporary stationary location.

2. The system of claim 1 wherein the vehicle is an autonomous driverless vehicle.

3. The system of claim 1 wherein the vehicle is selected from the group consisting of self-powered vehicles, towable vehicles, portable stations, autonomously driven vehicles, ground vehicles, nautical vehicles, and airborne vehicles.

4. The system of claim 1 wherein the concierge human UI comprises a component selected from the group consisting of a microphone, keypad, mouse, stylus, touchscreen, display, locker access sensor, camera, audio speaker, and combinations thereof;
   wherein the locker communications device transmits concierge UI signals to the package transfer service server for analysis and receives an acknowledgement; and,
   wherein the concierge human UI is connected to the locker attendant UI in response to the acknowledgement.

5. The system of claim 1 further comprising:
   a publicly accessible communications device attached to the locker selected from the group consisting of an IEEE 802.11 Wireless Local Area Network (WLAN) access point (AP), an IEEE 802.15 Wireless Personal Area Network (WPAN) AP, an Internet signal booster, a cellular signal booster, and combinations thereof.

6. The system of claim 1 further comprising:
   a media projection subsystem, for projecting a media message to a general pubic.

7. The system of claim 6 wherein the media projection subsystem projects media messages via the concierge human UI display, when the concierge human UI is not connected to the locker attendant human UI.

8. The system of claim 1 further comprising:
   sensors attached to the locker to receive local environmental data from a device selected from the group consisting of a camera, microphone, weather sensor, odor sensor, photodetector, chemical sensor, wireless spectrum receiver, wireless service traffic analyzer, radiation sensor, air quality monitor, and combinations thereof; and,
   wherein the locker communications device transmits the environmental data to the package transfer service server.

9. An automated package transfer method with a concierge interface, the method comprising:
   providing a publicly accessible locker, associated with a package transfer service, with a compartment configured to limit access to a stored package;
   providing a vehicle attached to the locker;
   providing a location subsystem attached to the vehicle to supply vehicle location information;

providing a locker communications device embedded with the locker to transmit the vehicle location information to a package transfer service server;

providing a concierge human user interface (UI);

moving the locker to a selected temporary stationary location using the vehicle;

using a targeting subsystem, cross-referencing stationary locations to weighted values;

selectively granting access to the locker compartment; and, using the locker communications device to selectively connect the concierge human UI to a remotely located locker attendant human UI associated with the package transfer service in response to the locker being parked in the selected stationary location.

10. The method of claim 9 wherein providing the locker communications device includes connecting the locker embedded communication device with a package transfer service server communications device.

11. The method of claim 9 wherein moving the locker includes positioning the vehicle at a selected stationary location using an autonomous driverless software application embedded in a non-transitory memory.

12. The method of claim 9 wherein providing the vehicle includes providing a vehicle selected from the group consisting of self-powered vehicles, towable vehicles, autonomously driven vehicles, portable stations, ground vehicles, nautical vehicles, and airborne vehicles.

13. The method of claim 9 wherein providing the concierge human UI includes providing a component selected from the group consisting of a microphone, keypad, mouse, stylus, touchscreen, display, audio speaker, locker access sensor, camera, and combinations thereof;

wherein providing the locker communications device includes transmitting UI signals to the package transfer service server f or analysis and receiving an acknowledgement; and, wherein connecting the concierge human UI to the locker attendant UI includes connecting in response to the acknowledgement.

14. The method of claim 9 wherein providing the locker communications device includes providing a publically accessible communications device selected from the group consisting of an IEEE 802.11 Wireless Local Area Network (WLAN) access point (AP), an IEEE 802.15 Wireless Personal Area Network (WPAN) AP, an Internet signal booster, a cellular signal booster, and combinations thereof.

15. The method of claim 9 further comprising:
providing a media projection subsystem, for projecting a media message to a general pubic.

16. The method of claim 15 wherein providing the media projection subsystem includes projecting media messages via a concierge human UI display, when the concierge human UI is not connected to the locker attendant human UI.

17. The method of claim 9 further comprising:
providing sensors to receive local environmental data from a device selected f rom the group consisting of a camera, microphone, weather sensor, odor sensor, photodetector, chemical sensor, wireless spectrum receiver, wireless service traffic analyzer, radiation sensor, air quality monitor, and combinations thereof;
and,
wherein providing the locker communications device includes using the locker communications device to transmit environmental data to a package transfer service server.

18. An automated package transfer system with a concierge interface, the system comprising:
an autonomously driven vehicle;
a publicly accessible mobile locker attached to the vehicle, with a compartment configured to limit access to a stored package;
a location subsystem attached to the vehicle providing vehicle location information;
a targeting subsystem cross-referencing stationary locations to weighted values;
a locker security mechanism for controlling access to the locker compartment;
a locker communications device embedded with the locker transmitting vehicle location information;
a concierge human user interface (UI) connected to the locker communication device;
a package transfer service server comprising:
a locker attendant human UI;
a package transfer service communication device connected to the locker communication device; and,
wherein the concierge human UI s selectively connected to the locker attendant human UI in response to the vehicle being parked in a selected stationary location.

* * * * *